United States Patent [19]
Duffy et al.

[11] Patent Number: 5,176,476
[45] Date of Patent: Jan. 5, 1993

[54] ROUTER CUTTING BIT

[75] Inventors: James P. Duffy, Springfield; Frances T. Kendra, Aston, both of Pa.; Alfred J. Smith, Claymont, Del.

[73] Assignee: The Boeing Company, Seattle, Wash.

[21] Appl. No.: 411,260

[22] Filed: Sep. 25, 1989

Related U.S. Application Data

[63] Continuation of Ser. No. 102,616, Sep. 30, 1987, abandoned.

[51] Int. Cl.⁵ ............................................. B23C 5/10
[52] U.S. Cl. ........................................ 407/63; 407/61
[58] Field of Search ....................... 407/54, 55, 56, 58, 407/59, 61, 62, 63

[56] References Cited

U.S. PATENT DOCUMENTS

| | | | |
|---|---|---|---|
| 3,106,191 | 10/1963 | Newman | 407/63 |
| 3,736,634 | 6/1973 | Sonnie | 29/103 A |
| 4,212,568 | 7/1980 | Minicozzi | 407/63 |
| 4,231,693 | 11/1980 | Kammeraad | 408/230 |
| 4,285,618 | 8/1981 | Shanely, Jr. | 407/59 |
| 4,497,600 | 2/1985 | Kishimoto | 407/53 |
| 4,560,308 | 12/1985 | Deller | 407/63 |
| 4,572,714 | 2/1986 | Suzuki et al. | 408/230 |
| 4,721,421 | 6/1989 | Klinger | 407/63 |

FOREIGN PATENT DOCUMENTS 22479 of 1912 United Kingdom ................ 407/63

Primary Examiner—Bruce M. Kisliuk
Assistant Examiner—John A. Marlott
Attorney, Agent, or Firm—Jones, Tullar & Cooper

[57] ABSTRACT

A router bit for providing smooth finish cuts in soft metal, such as aluminum, includes a plurality of helical cutting edges that are disposed at a helix angle of 45 degrees. The cutting edges each include a cutting face having a positive rake angle of approximately 18 degrees, and a land portion having a primary relief angle of approximately 14 degrees, and a secondary relief angle of approximately 20 degrees. The bit shank is preferably ⅜ inch in diameter to increase rigidity. The combination of these specific angles and the shank diameter provides a cutting bit that can cut soft aluminum with a resultant finish that meets or exceeds aircraft industry standards.

7 Claims, 2 Drawing Sheets

ROUTER CUTTING BIT

This is a continuation of co-pending application Ser. No. 07/102,616 filed on Sep. 30, 1987, now abandoned.

BACKGROUND OF THE INVENTION

1. Field of the Invention

The present invention relates to an improved router cutting bit, and in particular to a router cutting bit for cutting metal parts such as aluminum parts.

With the improved router cutting bit according to the invention the cut surface is provided with a smooth resultant finish absent rough edges.

2. Prior Art

In the manufacture of aluminum parts, for example for aircraft, the resultant finish on the cut surface of the aluminum part must meet standards specified by all aircraft manufactures (125 rms finish). If the cutting bit used in the cutting operation does not produce such a finish it becomes necessary to subject the part to a secondary finishing operation which can involve both polishing and deburring. The time and expense associated with the secondary finishing operation can be quite significant and therefore undesirable.

It is found that the cutting of different steels with a router cutting bit does not require as much of a secondary finishing operation as does aluminum, and in particular soft aluminum ("0" condition). Perhaps the inherent "softness" of aluminum relative to steel accounts for the difference. For either material, a typically constructed router cutting bit includes both primary and secondary lands on its outer surface adjacent to the cutting tip. An example of such a bit is disclosed in U.S. Pat. No. 4,560,308.

At the outset, it was presumed that the commercially available router cutting bits used for steel as well as other "hard" metals and having both primary and secondary lands could be used successfully to cut aluminum and in particular the noted soft aluminum to the proper finish in a single operation. However, extensive experience has shown that this was not the case. Over a period of two years numerous router cutting bits having different angles and helixes were used without ever achieving the 125 rms finish. Many of the router cutting bits were offered by tool manufacturers after being appraised of the problem presented, still with negative results.

The following table summarizes several of the bits that were tested.

SUMMARY OF THE INVENTION

A router cutter for routing or end mill cutting of aluminum so that the finish is not excessive, i.e., in excess of 125 rms would be desirable. Such a router cutter would eliminate the secondary finishing operation of facing the cut surface and/or blending as a separate step.

The router cutter includes a shank and cutting portion extending from the shank. The cutting portion includes a core region which can be an integral extension of the shank and at least one tooth portion extending outwardly from the core region. Each tooth portion has a curved, generally concave chip removal inner surface and a generally convex outer surface having a pair of flat surfaces spaced from each other in the direction of rotation. Each flat surface defining a different angle with the horizontal axis.

Preferably, the cutting portion has parallel cutting edges, a helix angle of approximately 45°, a rake angle of approximately 18°, and flat surfaces which define angles of 14±2° and 20±3° for the flat surfaces closest to the concave surface and further from the concave surface, respectively.

It has been determined that these specific values provide a cutting tool that can cut soft aluminum with a resultant high finish that has not previously been achievable. Specifically, testing has shown this cutting bit to be capable of providing a 55 rms finish; a value that far exceeds the 125 rms standard established by the aircraft industry.

The 45 degree helix angle is important, not only because it helps provide a smoother finish, but also because it helps extend tool life. Router type cutters with straight teeth (e.g. 10 degree helix angle) cannot adapt to the abrupt changes in cuts. As the teeth enter and exit the work, shocks are transmitted as vibration or "chatter" which produces a rough surface finish, and shortens tool life. Vibration is minimized with a 45 degree helix because the load is distributed well over several teeth. This produces a smoother surface on the part.

The rake angle, like the helix angle, leads the teeth into the cut. The more positive rake angle, the more clearly defined is the chisel edge which is inclined into the cut so that the cutting action proceeds smoother. Experimentation has established that a rake angle of about 18 degrees provides the best results.

The primary and secondary relief angles are designed to prevent the back of the cutting teeth from rubbing the cut surface. Experimentation has established that

| Cutter Type | Primary Outside Diameter Clearance | Secondary Outside Diameter Clearance | Radial Rack Angle | Remarks |
| --- | --- | --- | --- | --- |
| Onsrud -40 -106 .250 downcut *H.S.S. 2 flute | 5° | 12° | 10° | Surface texture too rough |
| Bay state .250 downcut carbide 2 flute | 2° | 15° | 15° | Secondary angle ground with a step finish poor |
| Onsrud 43-002 and rbl 202220 and ER -69 - ES .250 H.S.S. downcuts (3) cutters, 1 flute | 12° | 10° | 15° | Severe abrasion and chatter surface rough |
| National Paraflute H.S.S. router bit 123.F | 0° | 12° | 18° | Modified drill rout severe abrasion |
| Basset .375 shank turned down to .250 2 flute upcut, carbide | 8° | 15° | 18° | Upcut cutter pulls chips back into cutter path instead of away from |

*High Speed Steel the best results are obtained with a primary relief angle of about 14 degrees, and a secondary relief angle of about 20 degrees. These angles are chosen to cleanly cut metal chips without rubbing them against the cut surface. The secondary angle is slightly larger than the primary angle to insure that as the primary angle wears from resharpening, etc., the relief surface does not become so large that it can rub against the cut.

To further improve the cutting action, ⅜ inch shank is used for the bit, instead of a previously used ¼ inch shank. The thicker shank increases the rigidity of the bit, thereby decreasing the tendency of the bit to flex during cutting.

As a result of the invention, significantly longer tool life, which reduces the required number of tool changes, faster routing, superior finish in one operation, less deburring, and reduced part handing is accomplished.

BRIEF DESCRIPTION OF THE DRAWINGS

Four figures have been selected to illustrate a preferred embodiment of the invention. These are.

DETAILED DESCRIPTION OF THE PREFERRED EMBODIMENT

Figure 1:
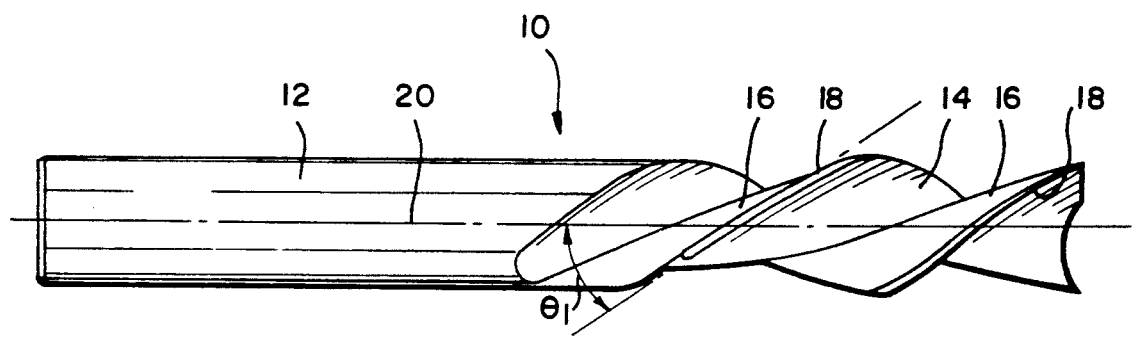
FIG. 1, which is a side view of a router cutter in accordance with a preferred embodiment of the present invention.

Turning now to a more detailed consideration of the present invention, there is shown a FIG. 1, a router cutting bit 10 having a shank 12 and a cutting end portion 14. Shank 12 is preferably ⅜ inches in diameter to increase the rigidity of the bit 10 over a standard ¼ inch thick bit. A pair of helically extending flutes 16 are uniformly spaced about the body of the bit 10, and extend longitudinally throughout the length of cutting portion 14. Flutes 16 form a pair of a parallel cutting edges 18, both of which are disposed at a helix angle $O_1$ with respect to the longitudinal axis 20 of the bit 10. In the preferred embodiment, $O_1$ is selected to be 45 degrees. This value was determined experimentally, to provide the smoothest cut, and also extend tool life.

Figure 2:
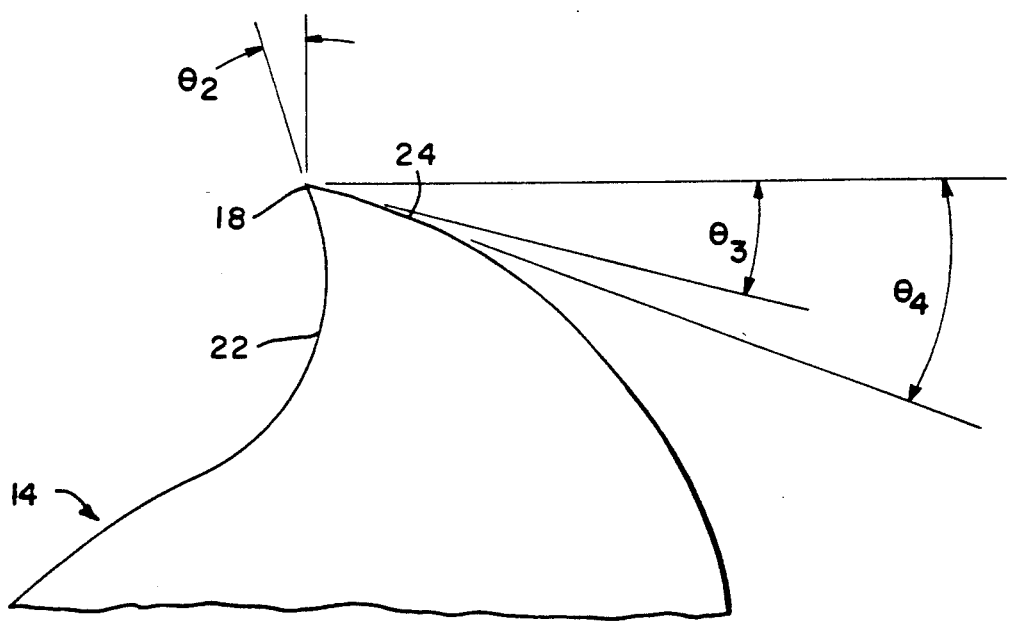
FIG. 2, which is a partial end view of the router bit showing the rake angle, the primary relief angle, and the secondary relief angle.

As seen in FIG. 2, each of the cutting edges 18, includes a cutting face 22 having a positive axial rake angle $O_2$, and a land 24 having primary relief or cutting angle $O_3$, and secondary relief, or cutting angle $O_4$. Experimentation has shown that the smoothest cuts are obtained with a rake angle of 18 degrees, a primary relief angle of 14 degrees ±2 degrees, and a secondary relief angle of 20 degrees ±3 degrees.

Figure 3:
FIG. 3, which is a photograph magnified 55× of an aluminum surface cut with a router bit using parameters other than those of the present invention.
Figure 4:
FIG. 4, which is a photograph magnified 55× of an aluminum surface cut with a router bit according to the present invention.

All of these angular values combine to provide a cutting bit that, when used to cut soft aluminum, cleanly cuts metal chips without rubbing them into the cut, and does not vibrate or chatter during cutting. The result is a cutting bit that provides a 55 rms finish in soft "O" condition aluminum; a value that far exceeds aircraft industry standards, and a value that has heretofore been unobtainable with any previously known router bit designs. This can be seen from a comparison of FIGS. 3 and 4. Both figures are photographs, magnified 55×, of a cut surface of soft "O" condition aluminum. The surface shown in FIG. 3 was cut with a cutting bit comprising a ¼ in diameter, a 10 degree radial rake angle, a 20 degree helix angle, a 0 degree primary angle and a 3 degree secondary angle. The surface shown in FIG. 4 was cut with a cutting bit according to the present invention. The finish achieved with the cutting bit having the parameters noted above is greater than 125 rms. The ridges and discontinuities are clearly visible. On the other hand the finish achieved with the present invention, at the noted magnification, has no ridges and discontinuities. It is quite smooth having a 55 rms finish. In addition, the edges of the surface are smooth and do not require any deburring.

What is claimed is:

1. A router bit for making smooth cuts in soft metal comprising:

an elongated generally cylindrical body having a shank portion and a cutting end portion; and a plurality of helically extending parallel cutting edges in said cutting end portion that are disposed at substantially a 45 degree helix angle with respect to a longitudinal axis of said router bit body, said cutting edges each including a cutting face disposed at a positive rake angle of substantially 18 degrees, and a land portion having a primary relief angle of substantially 14 degrees, and a secondary relief angle of substantially 20 degrees;

whereby, said helix angle, rake angle, primary relief angle, and secondary relief angle, work in combination with one another to provide a smooth finish cut when said router bit is employed to cut soft metal.

2. The router bit of claim 1, wherein the cutting end portion includes a core region and at least one tooth portion extending outwardly from the core region, and wherein each tooth portion has a curved, generally concave chip removal inner surface and a generally convex outer surface defining said land portion.

3. The router bit of claim 1, wherein the diameter of said shank portion is substantially three eights of an inch to increase rigidity of the bit.

4. A router bit for making smooth cuts in soft aluminum comprising:

an elongated generally cylindrical body having a shank portion and a cutting end portion; and a plurality of helically extending parallel cutting edges in said cutting end portion that are disposed at substantially a 45 degree helix angle with respect to a longitudinal axis of said router bit body, said cutting edges each including a cutting face disposed at a positive rake angle of substantially 18 degrees, and a land portion having a primary relief angle of substantially 14 degrees, and a secondary relief angle of substantially 20 degrees;

whereby, said helix angle, rake angle, primary relief angle, and secondary relief angle, work in combination with one another to provide a smooth finish cut when said router bit is employed to cut soft metal.

5. The router bit of claim 4, wherein the cutting end portion includes a core region and at least one tooth portion extending outwardly from the core region, and wherein each tooth portion has a curved generally concave chip removal inner surface and a generally convex outer surface defining said land portions.

6. A router bit for making smooth cuts in soft metal comprising:
- an elongated generally cylindrical body having a shank portion and a cutting end portion; and a plurality of helically extending parallel cutting edges in said cutting end portion that are disposed at substantially a 45 degree helix angle with respect to a longitudinal axis of said router bit body, said cutting edges each including a cutting face disposed at a positive rake angle of substantially 18 degrees, and a land portion having a primary relief angle of substantially 14 degrees, and a secondary relief angle of substantially 20 degrees;
- whereby, said helix angle, rake angle, primary relief angle, and secondary relief angle, work in combination with one another to provide a smooth finish cut, which exceeds 125 rms, when said router bit is employed to cut soft metal.

7. A router bit for making smooth cuts in soft aluminum comprising:
- an elongated generally cylindrical body having a shank portion and a cutting end portion; and a plurality of helically extending parallel cutting edges in said cutting end portion that are disposed at substantially a 45 degree helix angle with respect to a longitudinal axis of said router bit body, said cutting edges each including a cutting face disposed at a positive rake angle of substantially 18 degrees, and a land portion having a primary relief angle of substantially 14 degrees, and a secondary relief angle of substantially 20 degrees;
- whereby, said helix angle, rake angle, primary relief angle, and secondary relief angle, work in combination with one another to provide a smooth finish cut, which exceeds 125 rms, when said router bit is employed to cut soft metal.

* * * * *